United States Patent
Andrew et al.

(10) Patent No.: US 6,392,673 B1
(45) Date of Patent: *May 21, 2002

(54) METHOD FOR RESIZING USER INTERFACE ELEMENTS FOR AN OPERATING SYSTEM

(75) Inventors: Felix G. T. I. Andrew, Seattle; David A. Sobeski, Redmond, both of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 20 days.

(21) Appl. No.: 09/148,186

(22) Filed: Sep. 4, 1998

(51) Int. Cl.[7] .................................................. G06F 3/00
(52) U.S. Cl. ........................ 345/800; 345/809; 345/788
(58) Field of Search ................................ 345/333, 334, 345/339, 342, 347, 788–789, 798, 800–801, 762, 765, 809, 815, 825, 866

(56) References Cited

U.S. PATENT DOCUMENTS

| 5,546,525 A | * | 8/1996 | Wolf et al. ................... 345/334 |
| 5,583,981 A | * | 12/1996 | Pleyer ........................ 345/326 |
| 5,671,378 A | * | 9/1997 | Acker et al. ................ 345/346 |
| 5,886,694 A | * | 3/1999 | Breinberg et al. ........... 345/340 |
| 5,977,966 A | * | 11/1999 | Bogdan ....................... 345/334 |

OTHER PUBLICATIONS

IBM Technical Disclosure Bulletin (Dynamic Sizing for Graphical Control Objects, vol. 32–9B, p. 85; Feb. 1, 1990).*

* cited by examiner

*Primary Examiner*—Raymond J. Bayerl
*Assistant Examiner*—Sy Luu
(74) *Attorney, Agent, or Firm*—Banner & Witcoff, Ltd.

(57) ABSTRACT

An operating system program allows dialogue boxes, defined without any explicit resizing parameters, to be resized appropriately to the types of controls contained within them. The approach is to "walk-through" the dimensional definitions for the controls, their sizes and positions, and the dimensions of the dialogue box itself. With this information, rows and columns are defined and identified as resizable. When the dialogue box dimensions are changed, the additional length is distributed among the resizable rows and columns. According to the method, only rows, only columns, both rows and columns, and neither rows nor columns are identified as resizable. The method involves making a set of specifications about the resizing behavior of the various types of controls. The operating system essays the resource file for the dialogue, or a memory image derived from it, to define columns and rows partitioning the various controls. One set of columns and rows corresponds to borders. The operating system determines which columns and which rows are resizable based on the types of controls in each column and row. From this information, it is determined along which axes the dialogue can grow. Border columns and rows can be designated as special and controls in them treated as a single entity to maintain controls in stylistically preferred arrangements upon resizing.

23 Claims, 5 Drawing Sheets

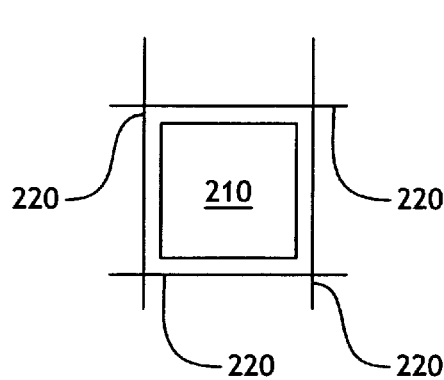
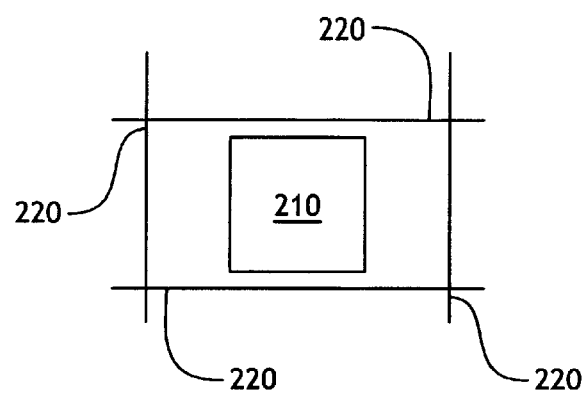
Fig. 5a                    Fig. 5b
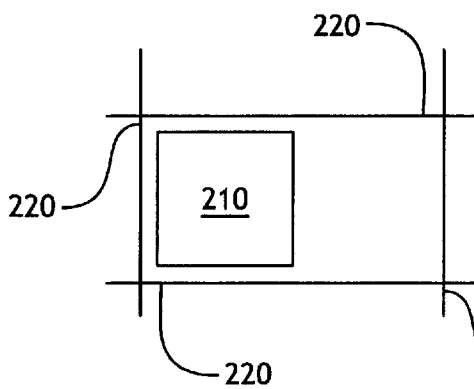
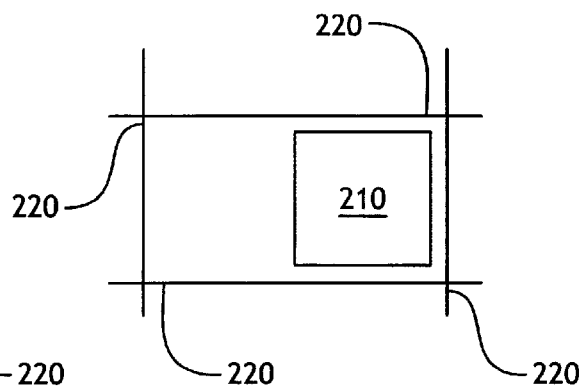
Fig. 5c                    Fig. 5d

METHOD FOR RESIZING USER INTERFACE ELEMENTS FOR AN OPERATING SYSTEM

TECHNICAL FIELD

This invention relates to graphical user interface (GUI) elements, in particular containers of GUI elements such as parent windows, forms and dialog boxes. The invention dynamically adds resizing semantics to GUI objects (containers) that do not already contain such information.

BACKGROUND OF THE INVENTION

Many computer operating systems generate window-based graphical user interfaces (GUIs). The operating systems generally provide tools to allow developers to generate windows with controls called dialogues. Operating systems may provide other kinds of user interface elements such as forms as well. Referring to FIG. 1, a dialogue box includes the controls: an edit box 10, a list box 20, and a static 30, a check box 40, and a combo box 50. The edit box 10 provides a space for the direct entry of text. In the example of FIG. 1, the edit box 10 allows a user to enter the name and/or path for a file. The list box 20 allows the user to select a predefined item from a list. The static 30 is simply a label. The check box 40 allows an item to be selected independently of other items, each corresponding to another check box. Most dialogue boxes also have at least one button 60 to invoke a particular command.

With larger monitors and higher resolution displays, users are likely to find it more useful to expand the length, for example, of a list box 20 so that more content (including controls) is displayed. Since all dialogue boxes must be defined for the smallest standard screen size and resolution, users with larger screens would likely prefer to take advantage of their increase screen area by displaying more information, thereby making their interfaces more useful.

A dialogue box can be defined by developers so that the dialogue box can be resized and its contents redistributed to take advantage of the new size. To define the dialogue features, a developer uses a resource editor to define the layout and characteristics of the dialogue box. A resulting resource file contains detailed specifications that define the controls and which parts of the box can be scaled and along which axes. The use of resource files allows for changes to be made to the arrangement and content of dialogue boxes and their controls without the need to modify the application code that displays the controls. The controls corresponding to the labels of the dialogue box can be changed by simply modifying the resource file for the particular dialogue box. The application can then be re-built without recompiling and, when subsequently executed, the application will have the operating system open the resource file and generate the dialogue. The process of generating the dialogue may involve reading the resource file and generating a derivative memory image that is used to create the dialogue rather than stepping through the resource file in real time as the dialogue is actually generated.

The need to specifically define the resizing characteristics of the dialogue arises because only some of the controls 10–60 can be expanded in a useful way. For example, expanding the dialogue box to increase the size of each feature, including fonts, would not allow more information to be displayed. Operating systems generally provide mechanisms for defining resizable dialogue boxes, but the code for defining such boxes is complex and most developers would prefer the expedient of avoiding the complexity of such expense. Developers may also already have a large number of dialogues that are already defined. To modify these to make them resizable requires a substantial amount of additional work. Also, any time the dialogues are revised to add new controls, the whole set of resizing code must revised to be compatible with the new controls.

Many applications already allow users to change the font size of the view of a document. The standard font sizes of the operating system user interface can also be changed. But this may not enhance the dialogue boxes or controls as desired.

SUMMARY OF THE INVENTION

An operating system program allows dialogue boxes, defined without any explicit resizing parameters, to be resized appropriately to the types of controls contained within them. The approach is to "walk-through" the dimensional definitions for the controls, their sizes and positions, and the dimensions of the dialogue box itself. With this information, rows and columns are defined and identified as resizable. When the dialogue box dimensions are changed, the additional length is distributed among the resizable rows and columns. According to the method, only rows, only columns, both rows and columns, and neither rows nor columns are identified as resizable. The resizing command is received by placing the pointing device at the edges or corners of the boxes in the well-known fashion. The pointer is hot tracked and changes shape to indicate the allowed dimensional changes for the dialogue. Thus, horizontal, vertical or diagonal double arrow may appear when the pointer is moved over the corner, as appropriate.

The method involves making a set of specifications about the resizing behavior of the various types of controls. For example, buttons and statics do not resize. List boxes can grow in length and height. Edit boxes can get wider, but not taller. In a preferred implementation, the walk-through occurs when the dialogue is ready to be displayed. When the application calls an operating system function to display the dialogue, it calls a particular API, in response to which particular messages are sent (most of the messages may be internal, for example, the particular font to be used). During that message, the operating system determines what controls are defined for the dialogue. The operating system thus essays the resource file for the dialogue, or a memory image derived from it, to define columns and rows partitioning the various controls. One set of columns and rows corresponds to borders. Using a predefined set of characteristics for each type of control, the operating system determines which columns and which rows are resizable. From this information, it is determined along which axes the dialogue can grow.

Once the dialogue is generated on the screen, during any messages generated when the pointer is over a border, the pointer is changed to indicate how the dialogue can change size. If the pointer is over a corner and the dialogue can grow, the pointer changes to a double-headed arrow aligned with the axis to which growth is restricted, or, if the dialogue can grow in along both axes, the pointer is changed to a diagonal double-headed arrow.

Upon a message to change the size of the dialogue, the growth is restricted to the axis or axes permitted to grow. If the dialogue cannot grow, the size takes its initial settings.

Upon a message indicating new dimensions, the additional size is allocated evenly among the resizable columns/rows. The controls are then reattached to the columns and rows. If the controls are resizable, they are stretched to fill the respective stretched column or row. The dialogue is then repainted with the new sizing information.

In alternative embodiments, the sizing information is given as a global operating system parameter. For example, all dialogues may be scaled by a fixed percentage, wherever possible. The global operating system parameter can be coupled to the screen resolution so that when the user changes the screen from 640×480 to 800×600, all dialogues are automatically scaled, to the extent possible, by a factor of 1.25.

Using the invention, no additional coding for the dialogues is necessary to allow such resizing. Also, the method uses a minimum of additional data to insure that processing is speedy. In addition, the particular set of resizing rules insures that the resized dialogues are visually agreeable and that the additional size available exploited to maximum ergonomic advantage. This is done by providing the following.

- All controls resize in both directions except: check boxes, group boxes, statics, combo boxes, and edit boxes.
- Edit boxes and combo boxes may become wider only.
- Any buttons along a bottom edge or right edge will maintain their spacing after resizing.
- Any buttons along a right edge are identified with a top, center, or bottom position and maintained at the respective top, center, or bottom position after resizing.
- Any buttons along a bottom edge are identified with a right, left, or middle position and maintained at the respective right, left, or middle position after resizing.
- Columns and rows are rated for resizing according to a weighting factor that is +2 for each resizable control and −1 for each non-resizable control and the column or row is designated resizable if its total weight is zero or positive.

BRIEF DESCRIPTION OF THE DRAWINGS

FIGS. 5a–5d illustrate alternative behaviors of non-resizable controls before and after horizontal resizing of a dialogue box.

DETAILED DESCRIPTION OF THE EMBODIMENTS

Figure 1:
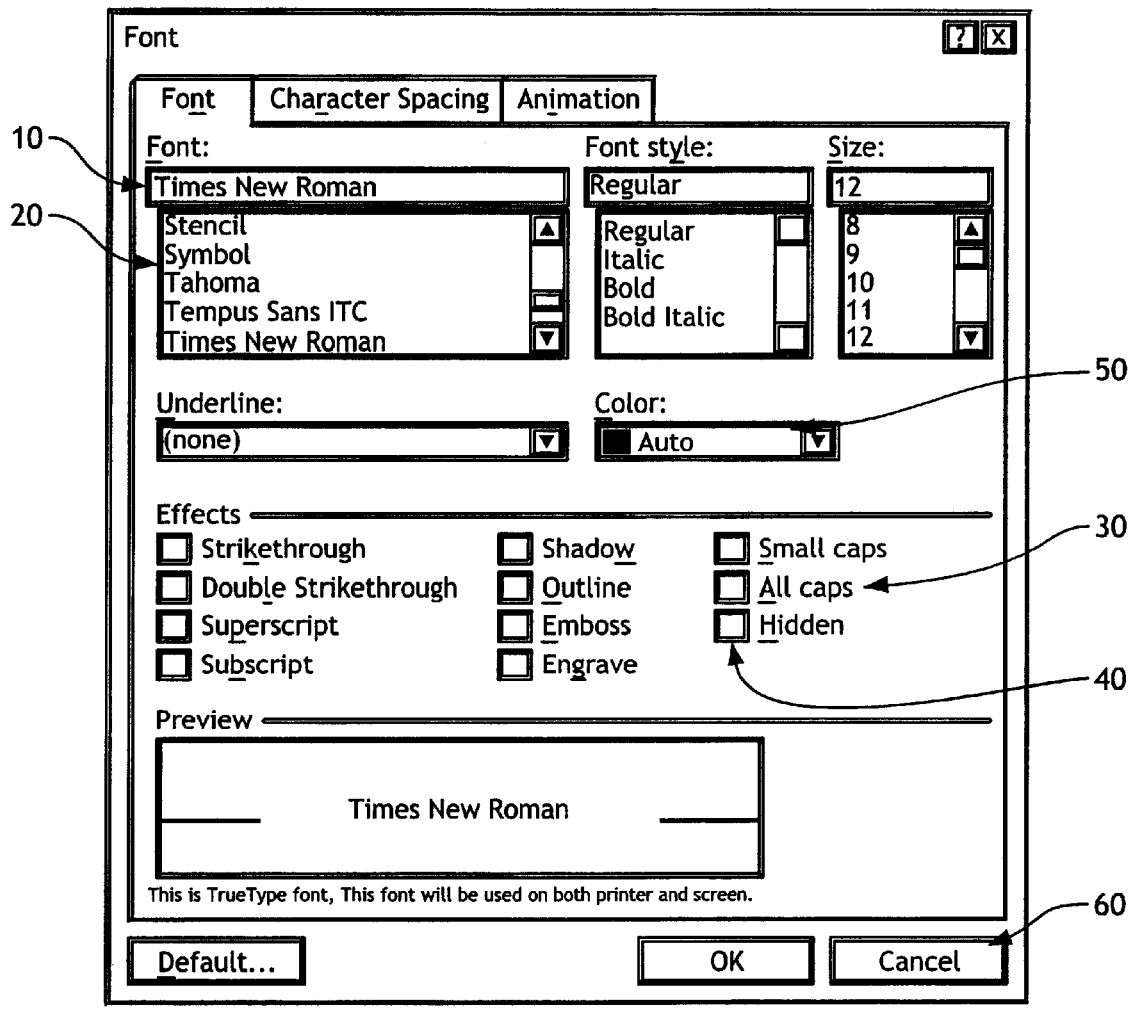
FIG. 1 is a drawing of a dialogue box according to the prior art.
Figure 2:
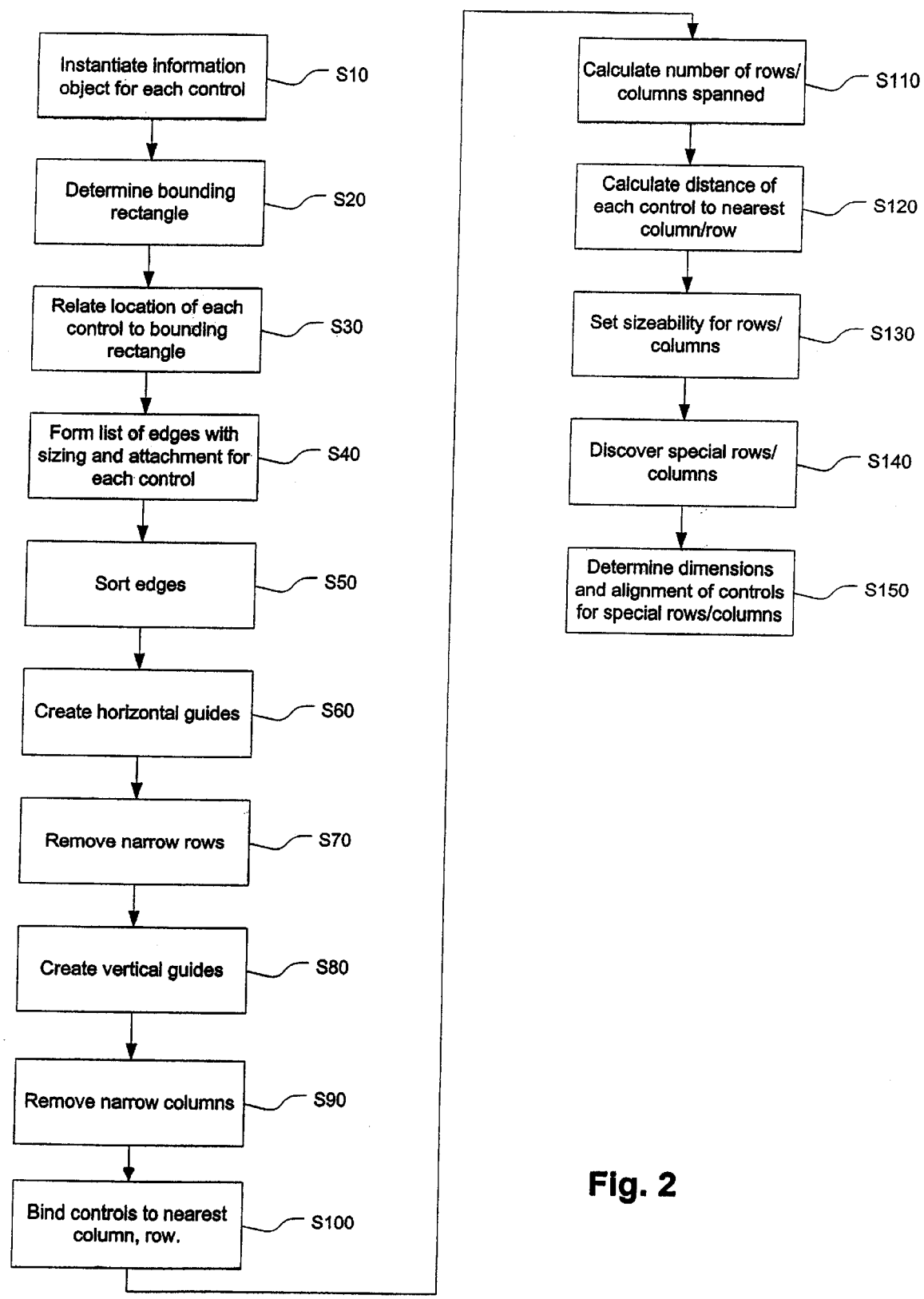
FIG. 2 is a flow chart defining a procedure for determining attributes of a dialogue box for purposes of resizing the dialogue box according to an embodiment of the invention.

Referring to FIGS. 1 and 2, during a message sent when a dialogue is ready to be displayed by a process, a resource file associated with the dialogue, or memory image derived from the resource file, is processed as follows. First in step S10, an information object is defined for each control to compile a list. In step S20, a bounding rectangle is derived from the control definitions which indicate the size and location of each control relative to the dialogue borders. The bounding rectangle is the minimum-sized rectangle that contains all the controls. In step S30, the location of each control is related to the bounding rectangle in the respective information object. In step S40, a list of edges is formed, one edge for each control. Each edge is a continuous line that tightly bounds the control on four sides, top, bottom, left, and right. Each edge is associated to a control. In step S50, the edges are sorted in ascending order of position. That is, the horizontal edges are sorted so that the ones that are spatially close together are adjacent in the list. The vertical edges are sorted so that the ones that are spatially close together are adjacent in the list. In step S60, a series of horizontal guides is generated. Each guide lies midway between adjacent horizontal edges. This assumes overlapping edges are considered a single edge or are removed from the list. The result of defining these horizontal guides is a series of rows, one between each guide. Those rows that are overly narrow (spaced apart below some threshold distance), are deleted from the series in step S70. In step S80, a series of vertical guides is generated. Each guide lies midway between adjacent vertical edges. This assumes overlapping edges are considered a single edge or are removed from the list. The result of defining these vertical guides is a series of columns, one between each guide. Those columns that are overly narrow (spaced apart below some threshold distance), are deleted from the series in step S90. In step S100, the edge of each control is bound to its nearest guide so that each control is connected with a respective top, bottom, left, and right guide. In step S110, the number of rows and columns spanned by each control is determined. In step S120, the distance of each control to the nearest column/row is determined.

In step S130, the sizeability of each column and row is determined. This is done by weighting each column and row as follows. For each row, add 2 to its weight for each vertically resizable control within it and subtract 1 from its weight for each vertically non-resizable control within it. For each column, add 2 to its weight for each horizontally resizable control within it and subtract 1 from its weight for each horizontally non-resizable control within it. If the total weight is zero or greater, the column or row is deemed resizable.

Next, in step S140, the control definitions are searched to determine if any rows or columns qualify as special. The idea behind designating rightmost columns and/or bottommost rows as special is to keep controls in an ergonomic and visually pleasing arrangement. Control buttons for canceling and accepting changes made in a dialogue are frequently grouped together in a particular location, typically along the right edge or bottom edge of the dialogue. Frequently, these controls are also located adjacent a corner or in the center (vertical alignment) or middle (horizontal alignment) of the edge. When a column or row is designated as special, the spacing and alignment (as well as size) of these controls is maintained when the dialogue is resized. In step S140, the data are searched for controls that indicate such a special placement. The criteria for being considered special may include whether the column or row contains a respective column or row of equal-sized buttons aligned with the respective vertical or horizontal edge. When a column and/or row is designated as special, the controls within them, that fit these criteria are treated as one (to preserve spacing) and their alignment (top, bottom, center, left, right, middle) preserved. In step S150, the alignment information is determined. If, for example, the controls fall within a threshold distance from an edge, they may be considered aligned with that edge (top, bottom, center, left, right, middle). If they are, in the aggregate, aligned, within a tolerance zone, with the middle of an edge, they may be designated as center or middle-aligned. In step S150, the sizes of the bounding rectangle for the special controls is also determined. One criteria may be that special controls share common edges, so that there may be no more than two extra edges for each control over and above the edges that bound the group.

Figure 3:
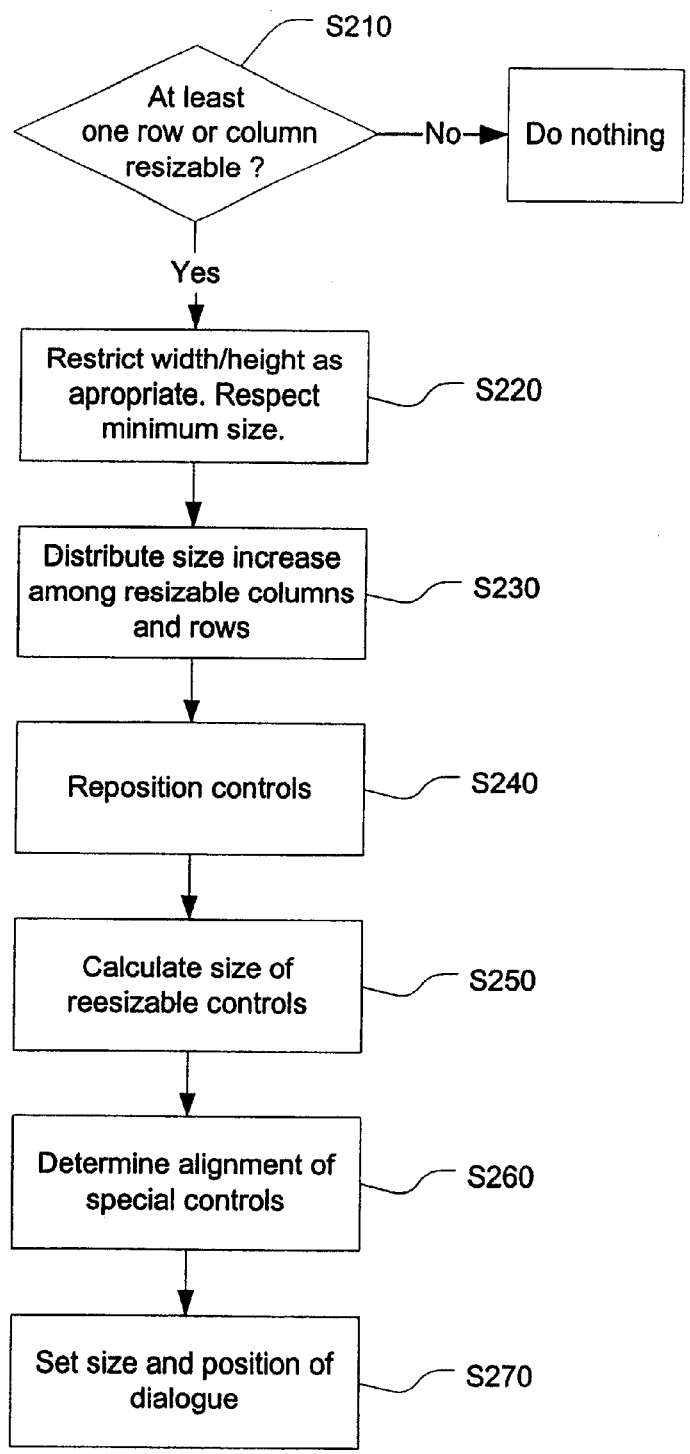
FIG. 3 is a flow chart of a procedure for resizing a dialogue box responsively to the attributes defined according to the procedure of FIG. 2.

Referring to FIG. 3, upon an appropriate event or message, for example in Windows®, the message WM_WINDOWPOSCHANGING would be sent, the operating system function defined in FIG. 3 may be invoked. In step S210, if at least one column or row is determined to be resizable, control would pass to step S220, otherwise the function would do nothing in response to the message. At step S220, resizing information is filtered. If only one or more rows is resizable, only vertical resizing information is processed. If only one or more columns is resizable, only horizontal resizing information is processed. If the resizing information indicates a vertical or horizontal size smaller than a minimum size, the resizing information is filtered out and not acted upon. In step S230, the additional vertical and/or horizontal space may be distributed evenly among the resizable rows and columns, respectively. Alternatively, the space may be distributed according to some predefined weighting scheme. The scheme could be simple or complex. For example, if the For example, a resizability "score" may account for the predetermined usefulness of resizing each particular type of dialogue element so that a column having multiples of such elements would receive a high score and a correspondingly higher share of the gained width. For example, edit boxes may be given a higher score than list boxes. In step S240, the controls are repositioned according to the guides to which they were deemed attached.

In step S250, resizable controls are resized by gluing their edges to their bounding guides so that their size is determined by the increase (or decrease) in the distance between the bounding guides. That is, the edges of the controls remain a fixed distance from their bounding guides both before and after resizing. Thus, a resizable control overlaying two resizable columns will expand more in width than a control overlaying only one resizable column.

In step S260, the alignment of special controls is determined. As indicated above, if a control is part of a special group (evenly spaced and aligned along a border), these controls are treated as a single non-resizable object and they follow the adjacent alignment guide. That is, for example, if the controls are deemed right-aligned, they follow the rightmost guide. For the other controls, if they are within a column or row that is resizable, those controls that are not resizable may be connected with one of their bounding guides or kept centered between their respective bounding guides. Finally, in step S270, the size and position of the dialogue is established.

Figure 4:
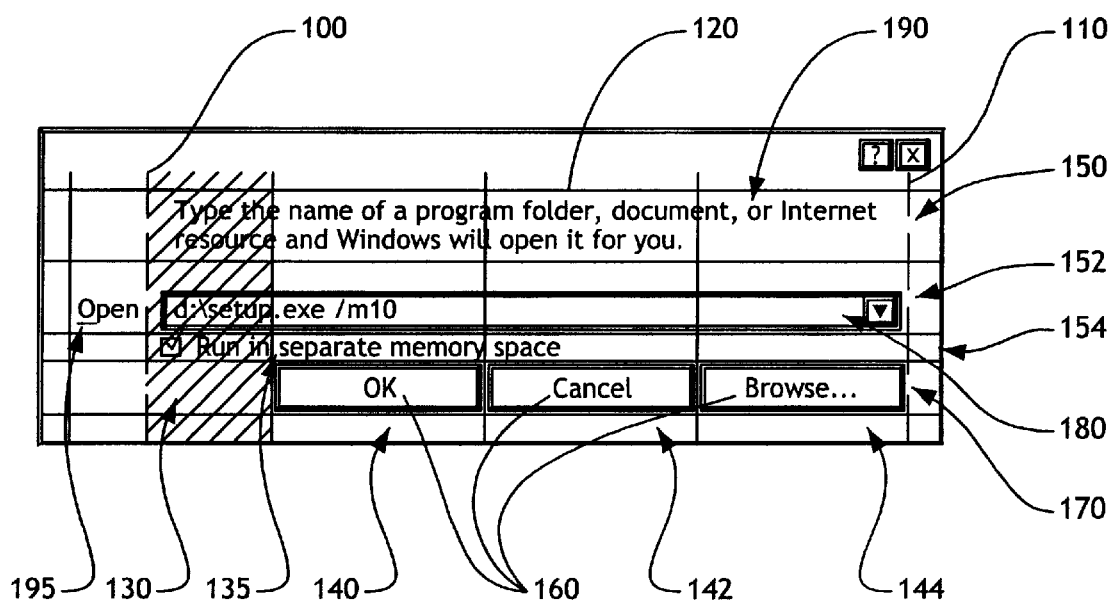
FIG. 4 is a diagram of a simple dialogue box showing guides and other attributes defined according to procedures defined in FIG. 2.

Referring to FIG. 4, a simple dialogue 1000 has a combo control 180, buttons 160, a check box 135, and statics 190 and 195. When the operating system functions are invoked by the appropriate message call (for example in Windows® the message would be WM_INITDIALOG), data defining the dialogue is loaded into memory from the resource file defining the dialogue 1000. Following the steps described in FIG. 1, guide lines 120 (typical horizontal guideline) 110, 100 (the latter being bounding guides for a resizable combo control 180) are defined. Columns 140, 142, and 144 are designated non-resizable because they each contain three non-resizable controls, a respective one of buttons 160, a static 190, and a check box 135 (check box includes both the actual box and the label that spans across the three columns as a single control), and a only one resizable control, combo box 180. Thus, the score for these columns would be +2 −3, or −1, making the total weight less than zero.

For column 130, shown with hatching, the total weight is zero because column 130 contains two non-resizable controls, static 190 and check box 135. It also contains a resizable combo control 180. Thus, column 130 is resizable because its total weight is +2 −1 −1, or zero.

Rows 150, 152, 154, and 170 are all non-resizable. First, none of these rows contains a vertically resizable control. All contain a vertically non-resizable control. Therefore the score for each is less than zero. Thus, during execution of the resizing command, the vertical resizing information is filtered out.

Row 170 is found to be a special row. Therefore row 170 would not be designated as resizable for that reason alone. The reason it is special is that it contains three buttons aligned with the bottom edge of the dialogue. As discussed above, such special status may be accorded by various criteria. Consistent with the style guide incorporated by reference below, where a set of controls are equally spaced and aligned along one edge (in this case, the bottom edge of the dialogue) and apparently "right-justified", "center justified", or "left-justified" (in this case, "right-justified"), the controls are clearly special. The "right-justification of the controls will remain when the dialogue is resized. That is, all three buttons 160 will remain a fixed distance from the right guide 110.

Note that the guides shown in FIG. 4 were defined by placing guides midway between all control edges and eliminating guides that were separated by less than a minimum spacing. Thus, if the buttons 160 were staggered vertically slightly, they would still be grouped together in a single row 170 after closely spaced guides were eliminated. Also note that although all guides fall midway between control edges, the guides that bound the entire set of controls lie directly adjacent the controls that determine their positions.

To determine the new size and location of the only resizable control, the bounding vertical guides 100 and 110 are used. These bounding guides 100 and 110 are separated further apart by a size increase command and the column 130 correspondingly dilated. The edges of the resizable control 180 remain fixed distances from these guides when the dialogue 1000 is resized. Thus, the edges of the combo control 180 remain "glued" to the bounding guides 100 and 110 as the dialogue is resized.

Note that the resizing command is received by placing the pointing device at the edges or corners of the boxes in the well-known fashion. The pointer is hot tracked and changes shape to indicate the allowed dimensional changes for the dialogue. Thus, horizontal, vertical or diagonal double arrow may appear when the pointer is moved over the corner, as appropriate.

Note that in a preferred embodiment, combo boxes are not vertically resizable but are horizontally resizable.

Note that the resizing data may be persisted by storing resizing data in a central data store such as the Registry of Windows®. Since users often change their output device, for example by docking a notebook computer, the persistence information may end up being applied under undesirable circumstances. Therefore, it is sometimes preferred not to act upon persisted resizing data although many applications do persist this resizing information. Alternatively, it may be preferable in operating systems where the configuration data is available, to make the persisted resizing data contingent on the configuration. For example, if the operating system can determine if the computer is docked and the size of the screen is specified for the docked configuration, the persisted information may be implemented. Otherwise the minimum size may be used.

Note that the border may be defined according to any suitable criterion for purposes of detecting when the pointing device overlies a border.

Referring to FIGS. 5a–5d, a non-resizable 210 control whose bounding guides (those closest to each of its respective outer edges) 220 are separated by virtue of being separated by a resizable column, can move in various different ways when the guides 220 are moved. For example, starting with the configuration of FIG. 5a, the control 210 can remain equidistant between the guides 220 as shown in FIG. 5b. Alternatively, the control 210 can follow one of the guides either to the left or to the right when the dialogue is resized as shown in FIGS. 5c and 5d, respectively. As discussed above, when the control is resizable, it remains glued at its edges to the respective bounding guides. The above applies equally to vertical resizing as well.

Note that although in the embodiments discussed above, the walk-through of the dialogue definitions is done when the dialogue is displayed, according to alternative embodiments, this walk-through could be done at other times using the teachings of the current specification. For example, the resource file or other data used to define the dialogue may be surveyed and an additional file generated for holding resizing data. This resizing data could be generated even before of the software application that defines and uses the dialogues.

Note that although in the embodiments described above, the example of dialogue boxes is discussed, it is apparent from the teachings of the present disclosure that the invention is applicable to other kinds of user-interface elements as well. For example, the invention is applicable to forms, message windows, or any type of "top level window."

The following reference contains additional rules that may be, and preferably are, used to control the resizing process. The entirety of the following book is incorporated herein by reference. *The Windows Interface Guidelines for Software Design: An Application Design Guide,* 576 pages, Published by Microsoft Press, Publication date: July 1995, ISBN: 1556156790.

What is claimed is:

1. A method in an operating system for resizing an operating system interface element containing controls, the controls being defined by control definitions stored in a memory, the method comprising the steps of:

receiving a command to resize said interface element;

responsively to said step of receiving, defining resizable regions of said interface element responsively to said control definitions, wherein the step of defining includes cumulating a total score by adding a value associated with each of said control definitions with each control in a given column or row contributing its respective value to the total score for the respective column or row, said column or row being designated as resizable based on the total score for said column or row;

resizing said interface element responsively to a result of said step of defining, whereby said interface element is resized by resizing only said resizable regions of said interface element.

2. A method as in claim 1, wherein said step of defining includes defining guides separating columns and rows of said controls, such that each of said resizable regions is bounded by at least two of said guides.

3. A method as in claim 2, wherein said guides are defined such that a separation between adjacent ones of said guides is always a minimum magnitude.

4. A method as in claim 2, wherein said step of defining includes identifying each of said controls as to whether it is vertically or horizontally resizable and designating each of said columns and rows as resizable responsively to said step of identifying.

5. A method as in claim 1, wherein said step of defining includes identifying each of said controls as to whether it is vertically or horizontally resizable.

6. A method as in claim 5, wherein said step of defining includes defining guides separating columns and rows of said controls, such that each of said resizable regions is bounded by at least two of said guides.

7. A method in an operating system for resizing an operating system interface element containing controls, the controls being defined by control definitions stored in a memory, the method comprising the steps of:

defining guides separating columns and rows of said controls;

assigning to each of said controls an attribute based on the type of control, the attribute being either vertically resizable, horizontally resizable, or non-resizable;

designating each of said columns and rows as resizable based on said attributes of said controls overlying said each of said columns and rows, wherein the step of designating includes cumulating a total score by adding a value associated with each of said attributes with each control in a given column or row contributing its respective value to the total score for the respective column or row, said column or row being designated as resizable based on the total score for said column or row.

8. A method as in claim 7, wherein said steps of defining and designating are performed subsequently to a step of receiving a command to resize said interface element.

9. A method as in claim 7, wherein said interface element is a dialogue box.

10. A method as in claim 7, further comprising the steps of:

determining whether a set of said controls lies in a predetermined geometric configuration with a predefined range of tolerance;

resizing said interface element while maintaining a fixed geometric distance between said controls of said set after said step of resizing.

11. A method as in claim 10, wherein:

said interface element is a dialogue box; and said step of determining includes determining if each of said set of controls defines a common line aligned with a lower-most edge or a right-most edge of each of said set of controls and said common line is within a predetermined distance of a respective edge of said interface element.

12. A method as in claim 10, wherein said step of resizing includes:

defining guides separating columns and rows of said controls;

assigning to each of said controls an attribute based on the type of control, the attribute being either vertically resizable, horizontally resizable, or non-resizable; and designating each of said columns and rows as resizable based on said attributes of said controls overlying said each of said columns and rows.

13. A method in an operating system for resizing a dialogue box of a graphical user interface, said dialogue box containing controls, the controls being defined by properties indicating respective positions of each of said controls within said dialogue box and control-type data indicating respective types of each of said controls stored in a memory, the method comprising the steps of:

identifying for each type of control in said control-type data, whether said type of control is resizable in a vertical direction;

dividing an area of said dialogue box into rows;

for at least one of said rows, determining overlying ones of said controls that overlie said at least one of said rows and designating said at least one of said rows as resizable when at least one of said overlying controls is of a type determined, in said step of identifying, to be resizable, wherein said step of designating includes cumulating a total score by adding a value associated with each of said overlying controls with each control in a given row contributing its respective value to the total score for the respective row, said row being designated as resizable based on the total score for said row; and resizing said dialogue box by stretching said at least one of said rows designated as resizable in said step of designating.

14. A method as in claim 13, wherein:

said at least one of said rows is at least two of said rows; and said step of resizing includes stretching by equal displacements each of said at least two of said rows designated as resizable in said step of resizing.

15. A method as in claim 13, further comprising the step of stretching vertically at least one said overlying controls.

16. A method in an operating system for resizing a dialogue box of a graphical user interface, said dialogue box containing controls, the controls being defined by properties indicating respective positions of each of said controls within said dialogue box and control-type data indicating respective types of each of said controls stored in a memory, the method comprising the steps of:

identifying for each type of control in said control-type data, whether said type of control is resizable in a horizontal direction;

dividing an area of said dialogue box into columns;

for at least one of said columns, determining overlying ones of said controls that overlie said at least one of said columns and designating said at least one of said columns as resizable when at least one of said overlying controls is of a type determined, in said step of identifying, to be resizable, wherein said step of designating includes cumulating a total score by adding a value associated with each of said overlying controls with each control in a given column contributing its respective value to the total score for the respective column, said column being designated as resizable based on the total score for said column; and resizing said dialogue box by stretching said at least one of said columns designated as resizable in said step of designating.

17. A method of forming a dialogue box by a graphical user interface, said dialogue box containing controls and having multiple subareas, said method comprising the steps of:

defining said dialogue box and storing resulting definition data in a computer permanent storage;

loading said resulting definition data into a memory of said computer;

displaying said dialogue box on a display of said computer;

receiving through an input of said computer a command to resize said dialogue box;

determining at least one resizable subarea of said dialogue box to stretch responsively to a type of a control defined in said definition data, whereby a need for defining resizability information in said definition data is avoided, wherein said step of determining includes cumulating a total score by adding a value associated with each control in a given subarea contributing its respective value to the total score for the respective subarea, said subarea being designated as resizable based on the total score for said subarea.

18. A method as in claim 17, wherein said subarea includes a columnar section of said dialogue box.

19. A method as in claim 17, wherein said subarea includes a row section of said dialogue box.

20. A method as in claim 17, wherein said step of defining is restricted to defining definition data that includes no data indicating a portion of said dialogue that may be increased in size.

21. A method in an operating system for resizing an operating system interface element containing controls, the controls being defined by control definitions stored in a memory, the method comprising the steps of:

defining guides separating columns and rows of said controls; and designating each of said columns and rows as resizable based on attributes of said controls overlying said each of said columns and rows;

said step of designating includes cumulating a total score by adding a value associated with each of said attributes with each control in a given column or row contributing its respective value to the total score for the respective column or row, said column or row being designated as resizable based on the total score for said column or row.

22. A method in an operating system for dynamically resizing an operating system interface element containing controls, the controls being defined by control definitions stored in a memory, the control definitions indicating whether the control is resizable, the method comprising the steps of:

receiving a command to resize said interface element from a user;

responsively to the step of receiving, dynamically defining resizable regions of said interface element, wherein the resizability of the region is based on the resizability of the controls that are at least partially within the region, and resizing said interface element responsively to the step of defining, whereby the interface element is resized by resizing said resizable regions of said interface element.

23. A method in an operating system for dynamically resizing a dialogue box of a graphical user interface without altering operating system code, said dialogue box containing controls, the controls being defined by properties indicating respective positions of each of the controls within said dialogue box and control-type data indicating respective types of each of said controls stored in a memory, the method comprising the steps of:

receiving a command to resize the dialogue box, identifying for each control whether the control is resizable based on the control type, responsively to the step of receiving, dividing the dialogue box into subareas, responsively to the step of dividing, dynamically determining whether the subareas are resizable based on the resizability of the controls that are at least partially in the subareas; and resizing the dialogue box by resizing the resizable subareas of the dialogue box.

* * * * *

UNITED STATES PATENT AND TRADEMARK OFFICE
CERTIFICATE OF CORRECTION

PATENT NO. : 6,392,673 B1
DATED : May 21, 2002
INVENTOR(S) : Felix Andrew et al.

It is certified that error appears in the above-identified patent and that said Letters Patent is hereby corrected as shown below:

Column 6,
Line 20, "all" has been replace with -- call --.

Column 9,
Line 24, -- of -- has been inserted before the word "said".

Signed and Sealed this

Tenth Day of September, 2002

Attest:

JAMES E. ROGAN
Attesting Officer
Director of the United States Patent and Trademark Office